(12) United States Patent
Nagy et al.

(10) Patent No.: US 7,143,789 B2
(45) Date of Patent: Dec. 5, 2006

(54) HIGH-PRESSURE HOSE COMPRISING SEVERAL LAYERS OF REINFORCING PLIES

(75) Inventors: Tibor Nagy, Budapest (HU); Andras Boros, Budapest (HU)

(73) Assignee: Phoenix Rubber Gumiipari Kft., Budapest (HU)

( * ) Notice: Subject to any disclaimer, the term of this patent is extended or adjusted under 35 U.S.C. 154(b) by 43 days.

(21) Appl. No.: 11/101,295

(22) Filed: Apr. 7, 2005

(65) Prior Publication Data

US 2005/0241716 A1  Nov. 3, 2005

(30) Foreign Application Priority Data

Apr. 7, 2004  (HU) ................ P 04 00747

(51) Int. Cl.
*F16L 11/00* (2006.01)

(52) U.S. Cl. ............ 138/123; 138/124; 138/129; 138/126; 138/127; 138/130; 138/172

(58) Field of Classification Search ........ 138/130, 138/129, 172, 127, 124, 125, 137, 140, 123, 138/174
See application file for complete search history.

(56) References Cited

U.S. PATENT DOCUMENTS 2,829,671 A * 4/1958 Ernst et al. ............ 285/245
3,481,368 A * 12/1969 Linger et al. ............ 138/125
3,566,924 A * 3/1971 Ambrus et al. .......... 138/130
4,343,333 A * 8/1982 Keister .................... 138/125
4,860,798 A * 8/1989 Kovacs et al. ........... 138/133
4,898,212 A * 2/1990 Searfoss et al. ......... 138/130
5,499,661 A   3/1996 Odru et al. .............. 138/124
5,749,985 A   5/1998 Sparks et al. ............. 156/64
5,934,335 A * 8/1999 Hardy ..................... 138/131
6,053,213 A * 4/2000 Jung et al. ............... 138/130
6,109,306 A * 8/2000 Kleinert .................. 138/127
6,123,114 A * 9/2000 Seguin et al. ............ 138/124
6,408,891 B1* 6/2002 Jung et al. ............... 138/127
2003/0102044 A1* 6/2003 Coutarel et al. .......... 138/130

FOREIGN PATENT DOCUMENTS

EP  1087162  3/2001
WO  WO 99/67560  12/1999

\* cited by examiner

*Primary Examiner*—Patrick Brinson
(74) *Attorney, Agent, or Firm*—Duane Morris LLP

(57) ABSTRACT

The present invention relates to a high-pressure hose structure comprising several layers of reinforcing plies where the reinforcing fibers are spirally laid.

Figure 1:
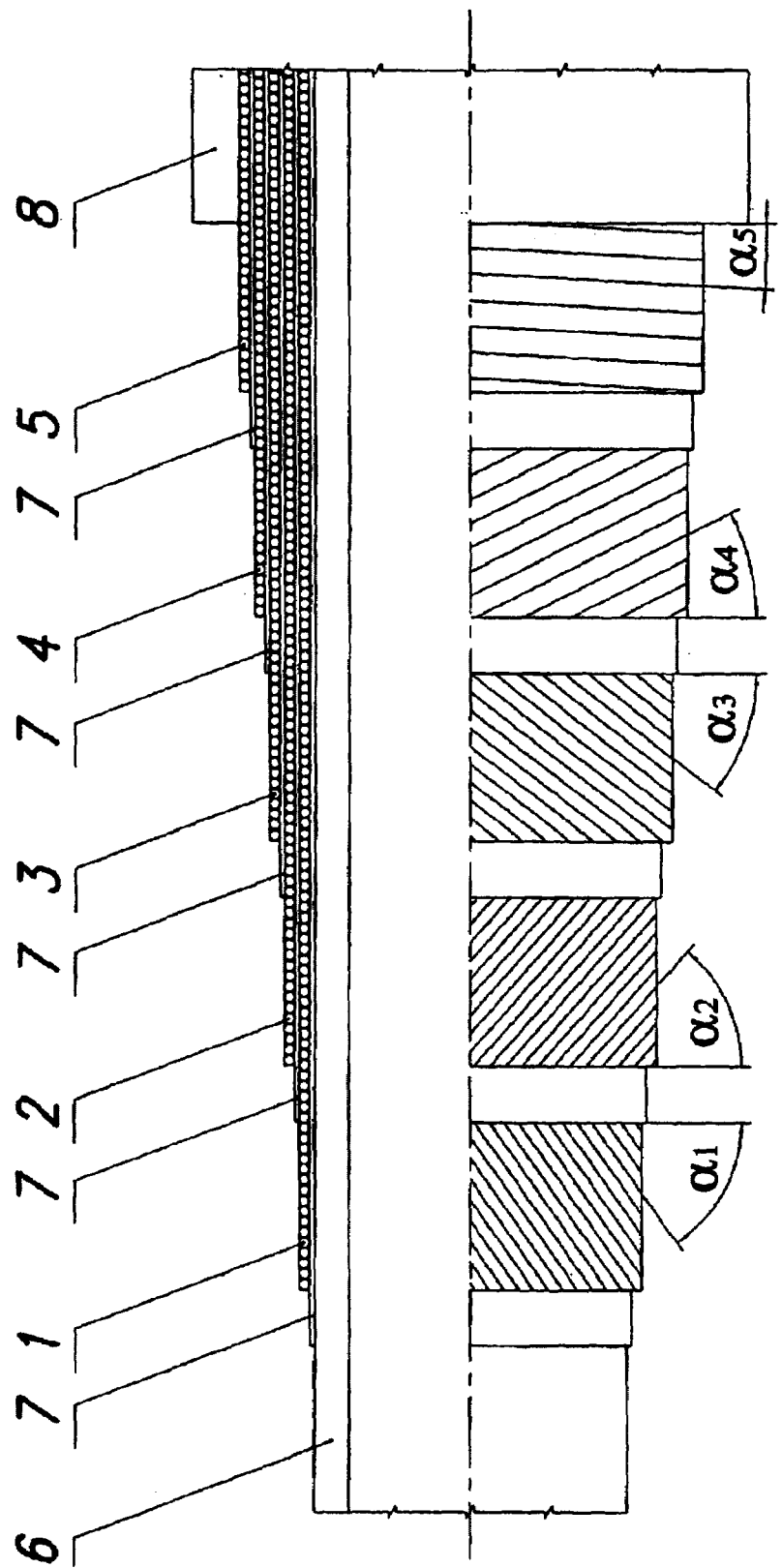

The hose structure according to the invention is characterized by the odd number of its reinforcing plies.

14 Claims, 1 Drawing Sheet

HIGH-PRESSURE HOSE COMPRISING SEVERAL LAYERS OF REINFORCING PLIES

RELATED APPLICATIONS

This application claims the benefit of Hungarian Application No. P 04 00747, filed Apr. 7, 2004. The entire disclosure of the Hungarian Application No. P 04 00747 is incorporated herein by reference.

The present invention relates to a high-pressure hose structure comprising several layers of reinforcing plies where the reinforcing fibres are spirally laid. A large number of reinforcing fibres laid in one layer form a reinforcing ply, briefly ply.

It is well known that high-pressure hoses are manufactured with various ply structures. The main problem of hose constructions comprising helical plies is that the structures should meet several conditions simultaneously, namely, the variation of length and twist should be minimal under inner pressure while flexibility should be maintained. This goal is achieved by hose constructions according to prior art with a number of plies whose direction of lay is alternating left to right or right to left. Occasionally, in order to maintain the approximately circular cross section of the hose at a small bend radius, a rigid helix with a relatively low angle of lay is built into the hose wall.

The so called "equilibrium angle" has been known for long (35.26° measured from the cross section perpendicular to the hose axis). This angle comes from the equilibrium of pressure and of the axial and tangential stresses which arise in a straight pipe loaded only by inner pressure.

It is also well known that hoses with helical reinforcing plies laid at the equilibrium angle do exhibit twisting when pressurized. The pressure resistance of hoses comprising such plies is behind expectation since the load bearing of the plies is not uniform. Many attempts have been made to eliminate this drawback.

Hungarian Pat. No. 199115 recommends a slightly different angle for 2- and 4-ply hoses with the condition that the average of the ply-angles should differ from the equilibrium angle by at least 10 angle minutes. The pressure resistance of these hoses—especially with 4 or more plies—is poor, therefore, this construction is now used only in case of 2 plies. Hungarian patent No. 198781 and the corresponding U.S. Pat. No. 4,860,798 disclose hoses comprising 2, 4, 6 and even 8 helical reinforcing plies. In these constructions the angle of lay decreases significantly from inside to the outside, even from 55° to 16°. The angle of lay is calculated by strict mathematical formulae which include elongation at break of the fibres as well. In practice, these hoses shrink when pressurized and their bending stiffness increases also significantly.

Several constructions are known where the tangential forces arising from inner pressure are borne by a low-angle pair of plies and the axial forces are borne by a pair of plies laid at an angle being significantly greater than the equilibrium one. Such hose constructions are described by Russian Pat. Nos 941867 and 994853 and GB Pat. No. 953833. However, the common drawback of these hoses is that their poor flexibility, they kink easily if bent without inner pressure, so they are not widespread in practice.

Hence, the object of the present invention is to provide a hose construction showing only minimal deformation under inner pressure and an excellent flexibility at the same time. In order the achieve this goal the tradition of using even numbered plies in the spirally reinforced hoses is ceased.

Thus, the embodiment according to the invention overcomes a technical prejudice in this field.

The key element of the flexible hoses according to the present invention is that they comprise an odd number of reinforcing helical plies.

The material of the reinforcing fibres is not determined by the invention but, naturally, its modulus of elasticity is orders of magnitude higher than that of rubber. The reinforcing fibres can be chosen from, for example, steel cable or wire, textile cord, carbon fibre, glass fibre, etc. The reinforcing fibres of the individual plies are preferably identical or at least their moduli of elasticity are similar. Reinforcing fibres are considered to be identical if their materials and geometrical shapes are essentially the same, e.g. steel wires with identical diameter and structure.

In a preferable embodiment of the hose according to the invention one ply is laid at a low angle, i.e. at an angle not higher than 10°, the number of fibres ($n_k$) in this ply is not greater than 10% of all ply fibres and the average of the other ply-angles is higher than 35.26°.

In an other preferable embodiment of the invention the number of fibres in the ply laid at a low angle fulfils the following inequality:

$$\text{ABS}\left(\frac{\sum_{i=1}^{n, i \neq k} 3 m r_i N_i F_i \cos\alpha_i}{r_k F_k}\right) > N_k \quad (1)$$

where index k refers to the low-angle ply, index i runs, except the low-angle ply, from inside to the outside, m is a sign function whose value is +1 for left-handed and −1 for right-handed plies, $r_i$ and $r_k$ are the mean radii of the respective plies, $N_i$ and $N_k$ are the numbers of fibres in the respective plies, $F_i$ and $F_k$ are the tensile breaking force of the fibres in the respective ply, n is the number of plies, ABS means absolute value.

It is preferable at the same time if the hose fulfils the following inequality:

$$0,36 \sum_{j=1}^{n} \frac{N_j F_j}{\sin\alpha_j} > \sum_{j=1}^{n} N_j F_j \sin\alpha_j > 0, 3 \sum_{j=1}^{n} \frac{N_j F_j}{\sin\alpha_j} \quad (2)$$

where j is a running index, including the low-angle ply.

The hose comprising an odd number of reinforcing plies according to the invention can be made so that only its uppermost ply is laid at a low angle (Example 1) or the low-angle ply is positioned between the higher-angle ones (Example 2) or the lowermost ply of the hose is laid at a low angle (Example 3).

If the properties of the reinforcing fibres are essentially identical in the individual plies then the uppermost, i.e. third ply is the low-angle one in a preferable three-ply embodiment. The number of fibres in the two lower plies can be identical which is preferable for production. Suitably, the angles of the lower two plies of such a hose do not differ from the ones determined by the following equations by more than ±3 degrees, respectively:

$$\sin \alpha_1 = 0.707 + 0.19z \quad (3)$$

$$\sin \alpha_2 = 0.707 - 0.19z \quad (4)$$

where
z is the relative ply distance, i.e. the difference of the mean radii of the two extreme plies divided by the mean radius of the second ply, $z=(r_3-r_1)/r_2$.

For 5 plies (see Example 4):

$$\sin \alpha_1 = 0.646 + 0.28z \quad (5)$$

$$\sin \alpha_2 = 0.646 + 0.09z \quad (6)$$

$$\sin \alpha_3 = 0.646 - 0.08z \quad (7)$$

$$\sin \alpha_4 = 0.646 - 0.23z \quad (8)$$

where
z is the relative ply distance, i.e. the difference of the mean radii of the two extreme plies divided by the mean radius of the third ply, $z=(r_5-r_1)/r_3$.

For 7 plies:

$$\sin \alpha_1 = 0.624 + 0.34z \quad (9)$$

$$\sin \alpha_2 = 0.624 + 0.18z \quad (10)$$

$$\sin \alpha_3 = 0.624 + 0.06z \quad (11)$$

$$\sin \alpha_4 = 0.624 - 0.05z \quad (12)$$

$$\sin \alpha_5 = 0.624 - 0.15z \quad (13)$$

$$\sin \alpha_6 = 0.624 - 0.23z \quad (14)$$

where
z is the relative ply distance, i.e. the difference of the mean radii of the two extreme plies divided by the mean radius of the fourth ply, $z=(r_7-r_1)/r_4$.

In a further preferable embodiment of the present invention, all plies comprise fibres with identical properties and the angle of the plies decreases from inside to the outside more strongly than in the previous case; further, the ply-angles do not differ from those determined by the following equations by more than ±3 degrees, respectively (the pressure resistance of such hoses is extremely good, however, the number of fibres varies from ply to ply).

For 3 plies (see Example 5)

$$\sin \alpha_1 = 0.707 + 0.73z \quad (15)$$

$$\sin \alpha_2 = 0.707 - 0.39z \quad (16)$$

where
z is the relative ply distance, i.e. the difference of the mean radii of the two extreme plies divided by the mean radius of the second ply, $z=(r_3-r_1)/r_2$.

For 5 plies (see Example 6):

$$\sin \alpha_1 = 0.646 + 0.59z \quad (17)$$

$$\sin \alpha_2 = 0.646 + 0.36z \quad (18)$$

$$\sin \alpha_3 = 0.646 - 0.09z \quad (19)$$

$$\sin \alpha_2 = 0.646 - 0.63z \quad (20)$$

where
z is the relative ply distance, i.e. the difference of the mean radii of two extreme plies divided by the mean radius of the third ply, $z=(r_5-r_1)/r_3$.

For 7 plies $$\sin \alpha_1 = 0.624 + 0.75z \quad (21)$$

$$\sin \alpha_2 = 0.624 + 0.58z \quad (22)$$

$$\sin \alpha_3 = 0.624 + 0.18z \quad (23)$$

$$\sin \alpha_4 = 0.624 - 0.17z \quad (24)$$

$$\sin \alpha_5 = 0.624 - 0.41z \quad (25)$$

$$\sin \alpha_6 = 0.624 - 0.46z \quad (26)$$

where
z is the relative ply distance, i.e. the difference of the mean radii of two extreme plies divided by the mean radius of the fourth ply, $z=(r_7-r_1)/r_4$.

Naturally, the hoses according to the present invention may be manufactured with angles which fall into the ranges between those given above, e.g. for a 3-ply hose:

$\arcsin(0.707+0.192) - 3° \leq \alpha_1 \leq \arcsin(0.707+0.73z) + 3°$
$\arcsin(0.707-0.192) + 3° \leq \alpha_1 \leq \arcsin(0.707-0.73z) - 3°$ The embodiments according to the present invention are described in detail by the figure and the following examples to facilitate its understanding without limiting it to the figure or the examples.

FIG. 1 shows the section of a rubber hose with 16 mm inner diameter, where the hose comprises a 2 mm thick liner 6 and five reinforcing plies 1 to 5. The plies are laid in embedding rubber 7. The hose is provided with cover 8. The relations between plies 1 to 5 of the depicted rubber hose and their angles $\alpha_1$ to $\alpha_5$ will be described in detail in Example 6.

EXAMPLES

Example 1

The product according to the present invention is a rubber hose with 90 mm inner diameter comprising 3 reinforcing plies and a 4 mm thick liquid-resistant layer (liner). Above the liner there are two load distributing rubberised textile layers. Each ply comprises the same type of steel cable with 5 mm diameter and F=31,700 N tensile strength. The construction radii and angles are as follows:

| Ply no. | Mean radius of the ply $r_i$ (mm) | Lay angle Of the ply $\alpha_i$ (deg) | Number of fibres, $N_i$ | Direction of lay |
|---|---|---|---|---|
| 1 | 54 | 48 | 49 | left |
| 2 | 60 | 43 | 49 | right |
| 3 | 66 | 3 | 4 | left |

The absolute value of the left hand side of inequality (1) is 17.3, so the chosen number of fibres in No. 3 low-angle ply fulfils the requirement of being lower than this value.

The corresponding data of inequality (2) are as follows: 2440 kN>2220 kN>2040 kN.

For the above hoses the relative ply distance, z is 0.2.

The ply-angles from Eq. (3), and (4) are $\alpha_1$: 48.2° and $\alpha_2$: 42.0°, the chosen angles are within the ±3 degrees limit.

Example 2

The product according to the present invention is a rubber hose with 76 mm inner diameter comprising 3 reinforcing plies, a 5 mm thick liner and 3 layers of load distributing rubberised textile layers. Each ply comprises the same type of steel cable with 2.1 mm diameter and F=6,000 N tensile strength. The low-angle ply is the middle one, the direction of lay of the plies does not alternate, ply 1 and 2 are laid in the same direction.

| Ply no. | Mean radius of the ply $r_i$ (mm) | Lay angle Of the ply $\alpha_i$ (deg) | Number of fibres, $N_i$ | Direction of lay |
|---|---|---|---|---|
| 1 | 48.9 | 39.4 | 88 | right |
| 2 | 52.2 | 2.7 | 7 | right |
| 3 | 55.5 | 52.2 | 123 | left |

The value of the left side of inequality (1) is 49.4, so the chosen number of fibres in No. 2 low-angle ply fulfils the requirement of being lower than this value.

The corresponding data of inequality (2) are as follows: 956 kN>920 kN>797 kN.

Example 3

The hose is similar to that of Example 2 with plies comprising the same type of steel cable, however, the lowermost ply is laid at a low angle.

| Ply no. | Mean radius of the ply $r_i$ (mm) | Lay angle Of the ply $\alpha_i$ (deg) | Number of fibres, $N_i$ | Direction of lay |
|---|---|---|---|---|
| 1 | 48.9 | 2.1 | 5 | right |
| 2 | 52.2 | 45.9 | 105 | left |
| 3 | 55.5 | 42.8 | 106 | right |

The value of the left side of inequality (1) is 30.8, so the chosen number of fibres in No. 1 low-angle ply fulfils the requirement of being lower than this value.

The corresponding data of inequality (2) are as follows:

947 kN>886 kN>790 kN.

Example 4

The hose with 100 mm inner diameter is reinforced with 5 polyester textile cord plies. The tensile strength of the warp fibres in the textile cord is 400 N/fibre, and the fibre density is 70 fibres/10 cm. The thickness of the rubberised textile cord is 2 mm. The construction data are as follows:

| Ply no. | Mean radius of the ply $r_i$ (mm) | Lay angle Of the ply $\alpha_i$ (deg) | Ply width (mm) | Number of fibres, $N_i$ | Direction of lay |
|---|---|---|---|---|---|
| 1 | 55 | 42.8 | 235 | 165 | right |
| 2 | 57 | 41.0 | 235 | 165 | left |
| 3 | 59 | 39.3 | 235 | 165 | right |
| 4 | 61 | 37.3 | 235 | 165 | left |
| 5 | 63 | 8.0 | 55 | 38 | right |

The value of the left side of inequality (1) is 40.9, so the chosen number of fibres in No. 5 low-angle ply fulfils the requirement of being lower than the given value.

The corresponding data of inequality (2) are as follows: 187 kN>173 kN>156 kN.

For the above hose the relative ply distance, z is 0.136.

The ply-angles from Equations (5) to (8) are $\alpha_1=43.2°$, $\alpha_2=41.2°$, $\alpha_3=39.3°$ and $\alpha_4=37.9°$. The chosen angles are within the ±3 degrees limit.

Example 5

The hose is similar to those of Example 2 and 3 with reinforcing plies comprising the same type of steel cable, however, the uppermost ply is laid at a low angle.

| Ply no. | Mean radius of the ply $r_i$ (mm) | Lay angle Of the ply $\alpha_i$ (deg) | Number of fibres, $N_i$ | Direction of lay |
|---|---|---|---|---|
| 1 | 48.9 | 53.1 | 110 | right |
| 2 | 52.2 | 41.1 | 97 | left |
| 3 | 55.5 | 6.0 | 16 | right |

The value of the left side of inequality (1) is 31.7, so the chosen number of fibres in No. 3 low-angle ply fulfils the requirement of being lower than this value.

The corresponding data of inequality (2) are as follows:

946 kN>920 kN>789 kN.

Example 6

The product according to the invention is a rubber hose with 16 mm inner diameter comprising a 2 mm thick liquid resistant liner. The used reinforcing ply is a steel wire with 0.7 mm diameter and 980 N tensile strength. The construction radii and angles are as follows:

| Ply no. | Mean radius of the ply $r_i$ (mm) | Lay angle Of the ply $\alpha_i$ (deg) | Number of fibres, $N_i$ | Direction of lay |
|---|---|---|---|---|
| 1 | 11.25 | 55.5 | 79 | left |
| 2 | 12.25 | 49.0 | 79 | right |
| 3 | 13.25 | 38.2 | 70 | left |
| 4 | 14.25 | 27.1 | 55 | right |
| 5 | 15.25 | 3.1 | 7 | left |

The absolute value of the left side of inequality (1) is 19.7, so the chosen number of fibres in No. 5 low-angle ply fulfils the requirement of being lower than the given value.

The corresponding data of inequality (2) are as follows: 199 kN>190 kN>166 kN.

For the above hose the relative ply distance, z is 0.302.

The ply-angles differ from those determined by Eqs. (17) to (20) by less than 3 degrees.

The invention claimed is:

1. A high-pressure hose comprising several layers of spirally laid reinforcing plies, wherein the number of reinforcing plies is odd, a lay angle ($\alpha_k$) of at least one of said plies as measured from a cross section perpendicular to a hose axis is lower than 10 degrees, a number of fibres ($N_k$) in the at least one of said plies is lower than $$\text{ABS}\left(\frac{\sum_{i=1}^{n,i\neq k} 3mr_i N_i F_i \cos a_1}{r_k F_k}\right) > N_k \quad (1)$$

where
  index k refers to the low-angle at least one of said plies,
  index i is a running index, except the low-angle at least one of said plies,
  m is a sign function whose value is +1 for left-handed and −1 for right-handed plies,
  $r_i$ and $r_k$ are the mean radii of the respective plies,
  $N_i$ and $N_k$ are numbers of fibres in the respective plies,
  $F_i$ and $F_k$ are the tensile breaking forces of the fibres in the respective plies,
  n is the number of plies,
  ABS means absolute value,
  and all the plies together fulfill the following inequality $$0,36\sum_{j=1}^{n}\frac{N_j F_j}{\sin a_j} > \sum_{j=1}^{n} N_j F_j \sin a_j > 0,3\sum_{j=1}^{n}\frac{N_j F_j}{\sin a_j} \quad (2)$$

where
  j is a running index, including the low-angle of the at least one of said plies.

2. A hose according to claim 1, wherein the individual plies comprise essentially identical reinforcing fibres.

3. A hose according to claim 1, wherein the number of fibres ($n_k$) in the at least one of said plies is not greater than 10% of all ply fibres and the other plies defining an average lay angle of higher than 35.26°.

4. A hose according to claim 1, wherein the odd number of reinforcing plies comprises three reinforcing plies, the uppermost ply is laid at a low angle and the angles of the two lower reinforcing plies do not differ by more than ±3 degrees from those determined by equations $$\sin \alpha_1 = 0.707 + 0.19z$$

$$\sin \alpha_2 = 0.707 - 0.19z$$

where
  z is the relative ply distance, i.e. the difference of the mean radii of the two extreme plies divided byte mean radius $r_2$ of the second ply, $z=(r_3-r_1)/r_2$.

5. A hose according to claim 1, wherein the odd number of reinforcing plies comprises five reinforcing plies, the uppermost ply is laid at a low angle and the angles of the four lower reinforcing plies do not differ by more than ±3 degrees from those determined by equations $$\sin \alpha_1 = 0.646 + 0.28z$$

$$\sin \alpha_2 = 0.646 + 0.09z$$

$$\sin \alpha_3 = 0.646 - 0.08z$$

$$\sin \alpha_4 = 0.646 - 0.23z$$

where
  z is the relative ply distance, i.e. the difference of the mean radii of the two extreme plies divided by the mean radius of the third ply, $z=(r_5-r_1)/r_3$.

6. A hose according to claim 1, wherein the odd number of reinforcing plies comprises seven reinforcing plies, the uppermost ply is laid at a low angle and the angles of the six lower reinforcing plies do not differ by more than ±3 degrees from those determined by equations $$\sin \alpha_1 = 0.624 + 0.34z$$

$$\sin \alpha_2 = 0.624 + 0.18z$$

$$\sin \alpha_3 = 0.624 + 0.06z$$

$$\sin \alpha_4 = 0.624 - 0.05z$$

$$\sin \alpha_5 = 0.624 - 0.15z$$

$$\sin \alpha_6 = 0.624 - 0.23z$$

where
  z is the relative ply distance, i.e. the difference of the mean radii of two extreme plies divided by the mean radius of the fourth ply, $z=(r_7-r_1)/r_4$.

7. A hose according to claim 1, wherein the odd number of reinforcing plies comprises three reinforcing plies, the uppermost ply is laid at a low angle and the angles of the two lower reinforcing plies do not differ by more than +3 degrees from those determined by equations $$\sin \alpha_1 = 0.707 + 0.73z$$

$$\sin \alpha_2 = 0.707 - 0.39z$$

where
  z is the relative ply distance, i.e. the difference of the mean radii of the two extreme plies divided by the mean radius of the second ply, $z=(r_3-r_1)/r_2$.

8. A hose according to claim 1, wherein the odd number of reinforcing plies comprises five reinforcing plies, the uppermost ply is laid at a low angle and the angles of the four lower reinforcing plies do not differ by more than ±3 degrees from those determined by equations $$\sin \alpha_1 = 0.646 + 0.59z$$

$$\sin \alpha_2 = 0.646 + 0.36z$$

$$\sin \alpha_3 = 0.646 - 0.09z$$

$$\sin \alpha_2 = 0.646 - 0.63z$$

where
  z is the relative ply distance, i.e. the difference of the mean radii of the two extreme plies divided by the mean radius of the third ply, $z=(r_5-r_1)/r_3$.

9. A hose according to claim 1, wherein the odd number of reinforcing plies comprises seven reinforcing plies, the uppermost ply is laid at a low angle and the angles of the six lower reinforcing plies do not differ by more than ±3 degrees from those determined by equations $$\sin \alpha_1 = 0.624 + 0.75z$$

$$\sin \alpha_2 = 0.624 + 0.58z$$

$$\sin \alpha_3 = 0.624 + 0.18z$$

$$\sin \alpha_4 = 0.624 - 0.17z$$

$$\sin \alpha_5 = 0.624 - 0.41z$$

$$\sin \alpha_6 = 0.624 - 0.46z$$

where
z is the relative ply distance, i.e. the difference of the mean radii of the two extreme plies divided by the mean radius of the fourth ply, $z=(r_7-r_1)/r_4$.

10. A hose according to claim 1, wherein an uppermost one of the plies is laid at a low angle and angles of lower reinforcing ones of the plies fall between values determined by $\sin \alpha_1 = 0.707 + 0.19z$ $\sin \alpha_2 = 0.707 - 0.19z$ and $\sin \alpha_1 = 0.707 + 0.73z$ $\sin \alpha_2 = 0.707 - 0.39z$ where
z is a relative ply distance comprising a difference between mean radii of extreme ones of the plies divided by a mean radius of an intermediate one of the plies.

11. A hose according to claim 1, wherein an uppermost one of the plies is laid at a low angle and angles of lower reinforcing ones of the plies fall between values determined by $\sin \alpha_1 = 0.646 + 0.28z$ $\sin \alpha_2 = 0.646 + 0.09z$ $\sin \alpha_3 = 0.646 - 0.08z$ $\sin \alpha_4 = 0.646 - 0.23z$ and $\sin \alpha_1 = 0.646 + 0.59z$ $\sin \alpha_2 = 0.646 + 0.36z$ $\sin \alpha_3 = 0.646 - 0.09z$ $\sin \alpha_2 = 0.646 - 0.63z$ where
z is a relative ply distance comprising a difference between mean radii of extreme ones of the plies divided by a mean radius of an intermediate one of the plies.

12. A hose according to claim 1, wherein an uppermost one of the plies is laid at a low angle and angles of lower reinforcing ones of the plies fall between values determined by $\sin \alpha_1 = 0.624 + 0.34z$ $\sin \alpha_2 = 0.624 + 0.18z$ $\sin \alpha_3 = 0.624 + 0.06z$ $\sin \alpha_4 = 0.624 - 0.05z$ $\sin \alpha_5 = 0.624 - 0.15z$ $\sin \alpha_6 = 0.624 - 0.23z$ and $\sin \alpha_1 = 0.624 + 0.75z$ $\sin \alpha_2 = 0.624 + 0.58z$ $\sin \alpha_3 = 0.624 + 0.18z$ $\sin \alpha_4 = 0.624 - 0.17z$ $\sin \alpha_5 = 0.624 - 0.41z$ $\sin \alpha_6 = 0.624 - 0.46z$ where
z is a relative ply distance comprising a difference between mean radii of extreme ones of the plies divided by a mean radius of an intermediate one of the plies.

13. A high-pressure hose comprising several layers of spirally laid reinforcing plies, wherein the number of reinforcing plies is odd and a number of fibres ($N_k$) in at least one of said plies is lower than $$ABS\left(\frac{\sum_{i=1}^{n, i \neq k} 3 m r_i N_i F_i \cos a_1}{r_k F_k}\right) > N_k \tag{1}$$

where
index k refers to the low-angle at least one of said plies,
index i is a running index, except the low-angle at least one of said plies,
m is a sign function whose value is +1 for left-handed and −1 for right-handed plies,
$r_i$ and $r_k$ are the mean radii of the respective plies,
$N_i$ and $N_k$ are numbers of fibres in the respective plies,
$F_i$ and $F_k$ are the tensile breaking forces of the fibres in the respective plies,
n is the number of plies,
ABS means absolute value.

14. A high-pressure hose comprising several layers of spirally laid reinforcing plies, wherein the number of reinforcing plies is odd and all plies together fulfill the following inequality $$0,36 \sum_{j=1}^{n} \frac{N_j F_j}{\sin \alpha_j} > \sum_{j=1}^{n} N_j F_j \sin \alpha_j > 0,3 \sum_{j=1}^{n} \frac{N_j F_j}{\sin \alpha_j} \tag{2}$$

where
j is a running index, including the low-angle of at least one of said plies,
$N_j$ is a number of fibres in the respective plies,
$F_j$ is the tensile breaking force of the fibres in the respective plies, and
n is the number of plies.

* * * * *